United States Patent
Jacquemont et al.

(10) Patent No.: US 9,429,237 B2
(45) Date of Patent: Aug. 30, 2016

(54) SEALING DEVICE

(71) Applicant: DEFONTAINE, La Bruffiere (FR)

(72) Inventors: Eric Jacquemont, Clisson (FR); Jean-Michel Delacou, Mortagne sur Sevre (FR); Didier Chatry, La Bruffiere (FR)

(73) Assignee: DEFONTAINE, La Bruffiere (FR)

( * ) Notice: Subject to any disclaimer, the term of this patent is extended or adjusted under 35 U.S.C. 154(b) by 606 days.

(21) Appl. No.: 13/902,266

(22) Filed: May 24, 2013

(65) Prior Publication Data

US 2014/0161619 A1  Jun. 12, 2014

(30) Foreign Application Priority Data

Jun. 4, 2012 (FR) ..................... 12 55170

(51) Int. Cl.
| | | |
|---|---|---|
| *F16J 15/32* | (2016.01) | |
| *F16C 33/78* | (2006.01) | |
| *F16J 15/34* | (2006.01) | |

(52) U.S. Cl.
CPC .......... *F16J 15/3232* (2013.01); *F16C 33/782* (2013.01); *F16C 33/7886* (2013.01); *F16J 15/3276* (2013.01); *F16J 15/3456* (2013.01); *F16C 2300/14* (2013.01); *F16C 2360/31* (2013.01)

(58) Field of Classification Search
CPC .............. F16J 15/3276; F16J 15/3456; F16J 15/3232; F16C 33/782; F16C 33/7886; F16C 2360/31; F16C 2300/14
See application file for complete search history.

(56) References Cited

U.S. PATENT DOCUMENTS

| | | | | | |
|---|---|---|---|---|---|
| 3,572,857 | A | * | 3/1971 | Hasegawa ........... | F16C 33/7856 277/348 |
| 3,642,335 | A | * | 2/1972 | Takahashi ............ | F16C 33/782 277/348 |
| 4,505,484 | A | * | 3/1985 | Ohkuma ............. | F16C 33/7853 277/348 |
| 4,854,749 | A | * | 8/1989 | Kohigashi ........... | F16C 33/7853 277/369 |
| 5,037,213 | A | * | 8/1991 | Uchida ............... | F16C 33/7823 384/482 |
| 5,133,609 | A | * | 7/1992 | Ishiguro ............. | F16C 33/7853 384/477 |
| 5,860,748 | A | * | 1/1999 | Okumura ............ | F16C 33/7853 277/562 |
| 2002/0009246 | A1 | * | 1/2002 | Tsuchida ............. | F16C 33/7853 384/486 |
| 2006/0291761 | A1 | * | 12/2006 | Gietl ................... | F16C 33/7853 384/486 |
| 2009/0324153 | A1 | * | 12/2009 | Russ ..................... | F16C 19/163 384/486 |
| 2011/0103728 | A1 | * | 5/2011 | Cowles ................ | F16C 19/163 384/484 |
| 2013/0323061 | A1 | * | 12/2013 | Jacquemont ......... | F16C 33/782 416/174 |

FOREIGN PATENT DOCUMENTS

| | | |
|---|---|---|
| DE | 103 09 393 A1 | 9/2003 |
| DE | 20 2010 014830 U1 | 3/2011 |
| DE | 20 2011 109164 U1 | 1/2012 |
| FR | 2 479 374 A1 | 10/1981 |
| JP | 2003-262230 A | 9/2003 |
| WO | WO 2010/043249 A1 | 4/2010 |

\* cited by examiner

*Primary Examiner* — Igor Kershteyn
(74) *Attorney, Agent, or Firm* — Arent Fox LLP

(57) ABSTRACT

A sealing device comprising a sealing circular piece, an inner ring and an outer ring, one of the two rings being able to rotate relative to an axis, the circular piece being arranged between the two rings and comprising two circular lips arranged in a groove at right angles to the axis of rotation, a top lip and a bottom lip substantially at right angles to the top lip, the bottom lip has a radius of curvature directed towards the interior, the groove being provided on the outer face of the inner ring and a third circular lip pressing on the outer face of the inner ring, and a part is fixed in an orifice formed in the outer ring.

10 Claims, 2 Drawing Sheets

SEALING DEVICE

CROSS-REFERENCE TO RELATED APPLICATION

Figure 1:
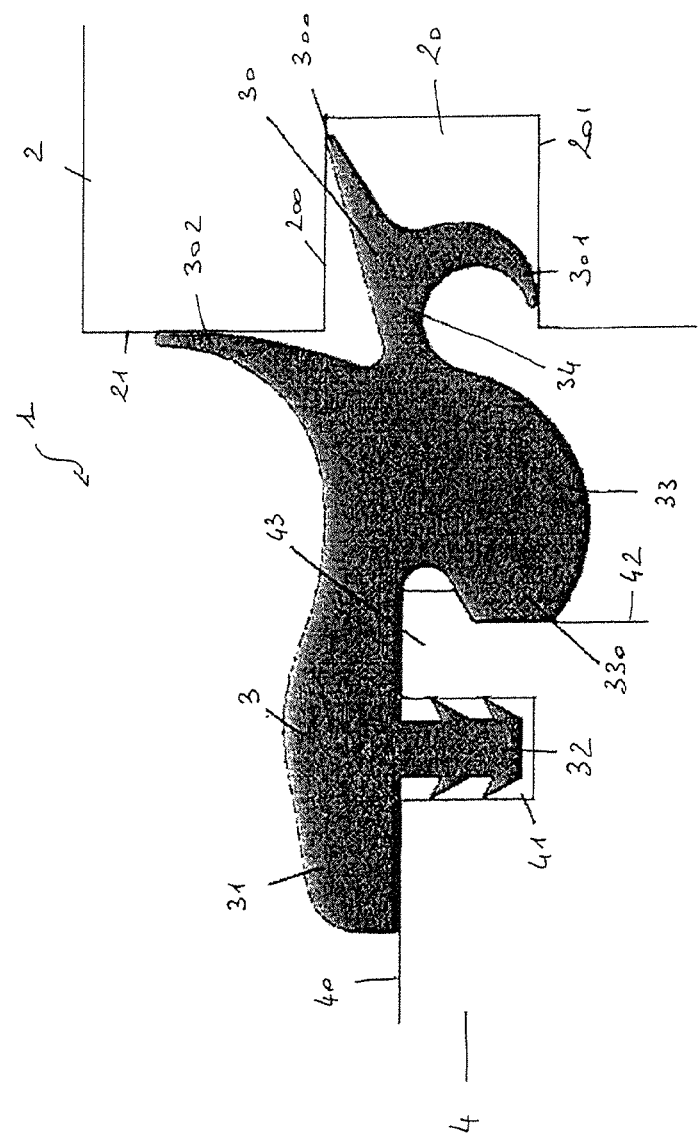

This application is based upon and claims the benefit of priority of the French Patent Application No. 1255170, filed Jun. 4, 2012, the disclosure of the prior application is hereby incorporated in its entirety by reference.

The present invention relates to a circular sealing device used in particular on the crown rings that include rolling bearings such as, for example, those of wind turbine blades.

These devices usually comprise two circular sealing pieces, usually made of rubber, an inner ring and an outer ring concentric to the first ring. The sealing pieces are fixed symmetrically, the first on top and pressing on one of the rings, the second underneath and pressing on the other ring and placed between the two rings. They comprise a lip that is positioned pressing on the outer face of the movable ring relative to their respective fixing.

There are two seals for each rolling bearing, a bottom seal which is fixed onto the surface of the ring pressing on the fixed support and a top seal which is fixed onto the other ring on the surface which is usually also in contact with the movable support.

However, these devices are not reliable enough because the pressure of the lubricating product inside the rolling bearing can cause the lip to be expelled, the seal thus no longer being provided, which creates leaks towards the outside. For purely ecological and aesthetic reasons, the grease which flows onto the blades or the hub of a wind turbine gives an impression and a reality of pollution which is damaging to the clean wind power image. This is all the more critical since these devices have large dimensions and the quantities of lubricant involved can be significant. For example, the crown rings of multiple mega watt wind turbine blades, which have diameters of several meters, currently 2 to 6 m, and certainly more in the near future.

The present invention sets out to resolve this problem with a sealing device comprising a sealing circular piece, an inner ring and an outer ring, one of the two rings being able to rotate relative to an axis, the circular piece being arranged between the two rings and comprising two circular lips arranged in a groove at right angles to the axis of rotation, a top lip and a bottom lip substantially at right angles to the top lip, said bottom lip has a radius of curvature directed towards the interior, the groove being provided on the face of one of the rings and a third circular lip pressing on said face of the inner ring, a fixing profile is fixed in an orifice formed in the other ring. The first two lips are prestressed in the groove. When the movable ring, under the effect of the load, is axially offset or tilts, the two lips follow this movement, one being pushed by the other regardless of the direction of the movement. The radial displacements of the movable ring have no effect on the effectiveness of the two lips, the top lip being able to slip radially with complete freedom in the groove whose sides are substantially at right angles to the axis of rotation of the crown ring. The third lip serves as an ordinary seal to protect the rolling bearing from the ingress of dust or foreign bodies from outside. The base of the third lip has a link with the part fixing the seal, the link is flexible enough to follow the offsets of the movable ring without an excessive increase in pressure in one direction or loss of contact in the other direction, thus avoiding any ingress of foreign bodies that might pollute the grease and the raceways. The bottom lip, situated inside, under the effect of the pressure of the grease, runs towards the bottom of the groove, its radius of curvature increases which increases the contact pressure of the top lip by virtue of its orthogonal position. The pressure of the two lips situated in the groove on the sides of this groove increases and, with it the effectiveness of the seal. Thus, the pressure of the lips adapts to the pressure prevailing inside the rolling bearing, when the pressure of the grease is low, there is a low contact pressure of the lips on the faces of the grooves and, conversely, if the pressure increases, the pressure of the lips increases.

According to a particular feature, the third lip is placed above the other two lips. The lip thus prevents any pollutant from entering into the groove. The third lip is a dust cap which prevents the two preceding contacts from being polluted and which creates a reserve of grease (grease added on assembly) ensuring lubrication of the intermediate lip.

According to another feature, the groove has two parallel sides. The groove is thus easier to produce.

According to a particular provision, the fixing profile is a fir tree profile.

According to another feature, a first lip presses on the top side of the groove.

According to another feature, the second lip presses on the bottom side of the groove. The pressure of the grease, by pushing on the second lip, also called bottom lip, increases the pressure on the top lip, hence a better pressure performance.

According to an additional feature, the sealing circular piece comprises a heel pressing on a face of the ring. This lip makes it possible to hold the part in place on said ring.

According to another feature, the ring has a peripheral bump which cooperates with the heel. The peripheral bump is placed on the face of the ring and ensures that the heel is completely immobilized on said ring.

According to a particular feature, the sealing circular piece has a restriction in an area which links the two lips to the third lip which makes it possible to relax the movement of following the axial oscillations of the movable ring.

The invention also relates to a wind turbine blade crown ring equipped with a sealing device having one or more of the preceding features.

Other advantages may still become apparent to the person skilled in the art on reading the example below, illustrated by the appended figure, given for purely illustrative purposes.

Figure 2:
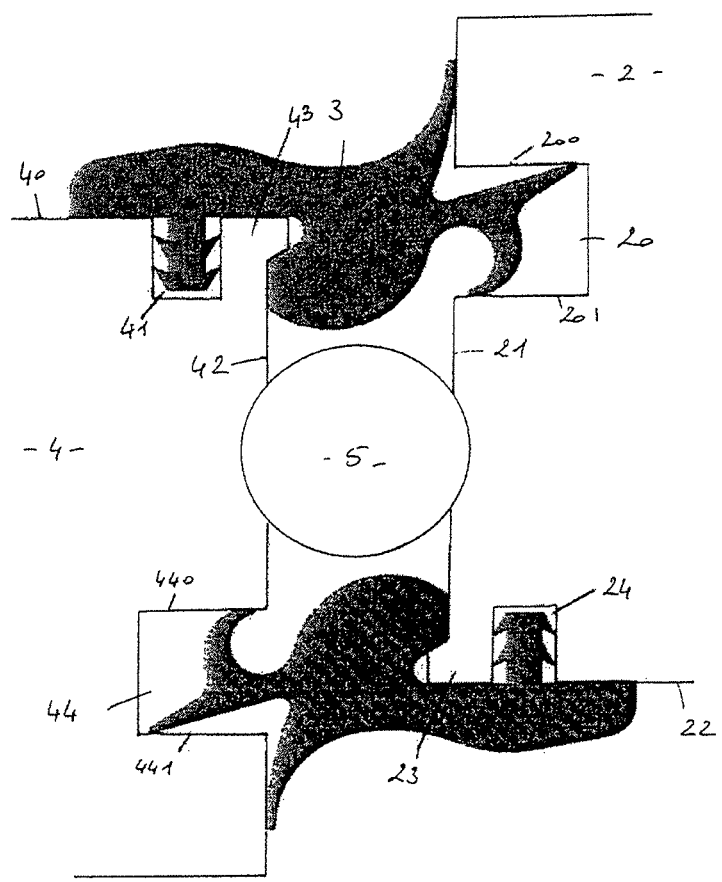

FIG. 1 represents a cross-sectional view of the sealing device according to the invention, FIG. 2 shows a rolling bearing in cross section.

Hereinbelow in the description, it will be assumed that the top is situated at the top of the figure and the bottom is situated at the bottom, the outside is situated on the right of the figure and the inside is situated on the left.

The sealing device 1 according to the invention comprises an inner ring 2 and an outer ring 4, and between the two is arranged a sealing circular piece 3 or seal. The axis of the rings is common (not represented) and situated in the right hand part of the figure. It will be assumed that the axis of the rings constitutes the centre of the sealing device and that the lubricant is placed between the two sealing circular pieces 3.

The inner ring 2 has, on its outer face 21, a circular groove 20. The groove 20 has two flanks: a top side 200 and a bottom side 201. The two sides 200 and 201 are parallel and at right angles to the axis of the rings. They could be inclined without departing from the framework of the invention.

Similarly, the outer ring 4, as can be seen in FIG. 2, has, on its inner face 42, a circular groove 44. Since the groove 44 is symmetrical to the groove 20, it will not be described further. The groove 44 comprises a side 440 which corresponds to the side 200, and a side 441 which corresponds to the side 201.

The sealing piece 3 has, on its inner part 30, two circular lips 300 and 301. The top lip 300 presses on the top side 200 of the groove 20, and the bottom lip 301 presses on the bottom side 201 of the groove 20. The two lips are at right angles to one another. The top lip 300 is substantially parallel to the top side 200, whereas the bottom lip 301 is substantially at right angles to the bottom side 201 and has a radius of curvature directed inwards. Under the effect of the pressure of the lubricating product, the lip 301 has a tendency to unwind, but the width of the circular groove 41 is such that complete unwinding is impossible. This pressure also creates a radial force which favours driving the lips 300 and 301 towards the bottom of the groove, opposing the extrusion of said lips under the pressure.

The second sealing piece 3 is placed in the same way in the groove 44.

A third lip 302 is situated above the other two lips 300 and 301. Said lip 302 presses on the outer face 21 of the inner ring 2 and the inner face 42 of the outer ring 4.

The two lips 300 and 301 are linked to the body of the circular piece 3 by an area 34 which is narrower to facilitate the movement of said lips 300 and 301.

The sealing piece 3 has, in its outer part 31, a profile 32 oriented downwards in the figure to cooperate with the groove 41, which is oriented upwards for the orifice 24. The profile 32 is a fir tree profile.

The sealing piece 3 also has an edge 330 situated in the central part 33 of said piece 3. This edge 330 is oriented towards the face 21 or the face 42 and cooperates with the side 21 or 42 of the ring 2 or 4. The side 21 or 42 has a peripheral bump 23 or 43 on which the edge 330 presses and which has a retaining effect opposing the extrusion of the profile 32 from the groove 41.

The bump 23 or 43 has an edge 230 or 430 substantially parallel to the heel 330.

As indicated previously, different variants are covered by the present invention, whether the seal is fixed onto the movable ring, or likewise onto the fixed ring, or whether the lips are oriented towards the centre or towards the outside of the crown ring.

The invention claimed is:

1. Sealing device comprising at least one sealing circular piece, an inner ring and an outer ring, one of the two rings being able to rotate relative to an axis, the circular piece being arranged between the two rings, wherein the circular piece comprises two circular lips arranged in a groove at right angles to the rotation axis, provided on the face of one of the rings, a top lip and a bottom lip substantially at right angles to the top lip, said bottom lip has a concave radius of curvature directed towards the interior and a third circular lip pressing on said face of the ring, and a fixing profile is fixed in a groove formed in the other outer ring.

2. Sealing device according to claim 1, wherein the third lip is placed above the other two lips.

3. Sealing device according to claim 1, wherein the groove has two parallel flanks.

4. Sealing device according to claim 1, wherein the fixing profile is a fir tree profile.

5. Sealing device according to claim 1, wherein the top lip presses on the side of the groove.

6. Sealing device according to claim 5, wherein the bottom lip presses on the side of the groove.

7. Sealing device according to claim 1, wherein the sealing circular piece comprises an edge pressing on an inner face of the ring.

8. Sealing device according to claim 7, wherein the ring has a peripheral bump which cooperates with the edge.

9. Sealing device according to claim 1, wherein the sealing circular piece has a restriction in an area which links the two lips to the third lip.

10. Wind turbine blade crown ring, equipped with a sealing device according to claim 1.

* * * * *